United States Patent
Cuthbert et al.

(10) Patent No.: US 9,535,948 B1
(45) Date of Patent: Jan. 3, 2017

(54) DATA ACCESS STATEMENT TRANSLATION

(71) Applicant: AMAZON TECHNOLOGIES, INC., Reno, NV (US)

(72) Inventors: David Allen Cuthbert, Bainbridge Island, WA (US); Shuo Li, Philadelphia, PA (US)

(73) Assignee: Amazon Technologies, Inc., Reno, NV (US)

( * ) Notice: Subject to any disclaimer, the term of this patent is extended or adjusted under 35 U.S.C. 154(b) by 391 days.

(21) Appl. No.: 14/107,288

(22) Filed: Dec. 16, 2013

(51) Int. Cl.
*G06F 17/30* (2006.01)

(52) U.S. Cl.
CPC .............. *G06F 17/30427* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,941,125 B2 * | 5/2011 | Chambers | .......... | H04N 1/00127 455/414.1 |
| 2001/0056428 A1 * | 12/2001 | Gajda | ................ | G06F 17/3056 |
| 2007/0027905 A1 * | 2/2007 | Warren | .................... | G06F 8/51 |
| 2011/0264664 A1 * | 10/2011 | Xiao | ................ | G06F 17/30613 707/741 |

* cited by examiner

Primary Examiner — Etienne Leroux
(74) Attorney, Agent, or Firm — Lindauer Law, PLLC

(57) ABSTRACT

Techniques are described for dynamic translation of data access statements. A first set of statements is sent by an executing process to access a first data storage that supports a first query language. The first set of statements is intercepted and translated into a second set of statements configured to access a second data storage that supports a second query language. The second set of statements may be executed on the second data storage, and the result data set may be sent to the executing process that generated the first set of statements. The first and second storages may employ different data storage formats, such as relational and non-relational storage formats. The behavior of the executing process may be monitored to determine the feasibility of modifying the source code of the process to employ a different query language.

20 Claims, 9 Drawing Sheets

DATA ACCESS STATEMENT TRANSLATION

BACKGROUND

Applications, libraries, and other types of software modules may include hard-coded statements written in a particular query language to access data stored on a particular type of data storage device. In some cases, an organization that operates or maintains the software modules may migrate data from one type of data storage device to another type of data storage. In cases where existing software modules include hard-coded statements in a particular query language, the software modules may not function properly when attempting to access a data storage device that supports a different query language or that implements a different transaction model.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for dynamically intercepting and translating statements configured to access a data storage device or service. An application may include data access statements (e.g., statements that are written into the source code) to access data stored on a first data storage. The application may be modified such that the application is linked with, or otherwise incorporates, a database driver that redirects the statements to a statement processing device instead of the first data storage. The statement processing device may perform operations to translate the statements from their original query language (e.g., a language supported by the first data storage) into a different query language. The translated statements may then be executed on a second data storage that supports the different query language, a different transaction model, or a different storage format. The result data set generated through execution of the translated statements may be returned to the statement processing device. The statement processing device may then return the result data set to the application that sent the original statements, in some cases after processing the result data set. Implementations may return the result data set to the application as if the result data set was generated based on executing the original statements on the first data storage. In some implementations, the interception and translation of the statements may be substantially transparent to the application that sent the statements, and may not require any modification of the application apart from incorporating a different database driver into the application.

The behavior of the application after receiving the result data set may provide an indication of the feasibility of modifying (e.g., refactoring or recoding) the application to interact with the second data storage instead of the first data storage. Accordingly, implementations may enable an estimate of the cost that may be expended to make such modifications, such as the cost in money, time, computing resources, human resources, and so forth. For example, if it determined that the application exhibits errors, failures, exceptions or other problems in response to receiving the result data set, a determination may be made that the modification of the application may be arduous or time-consuming.

Figure 1:
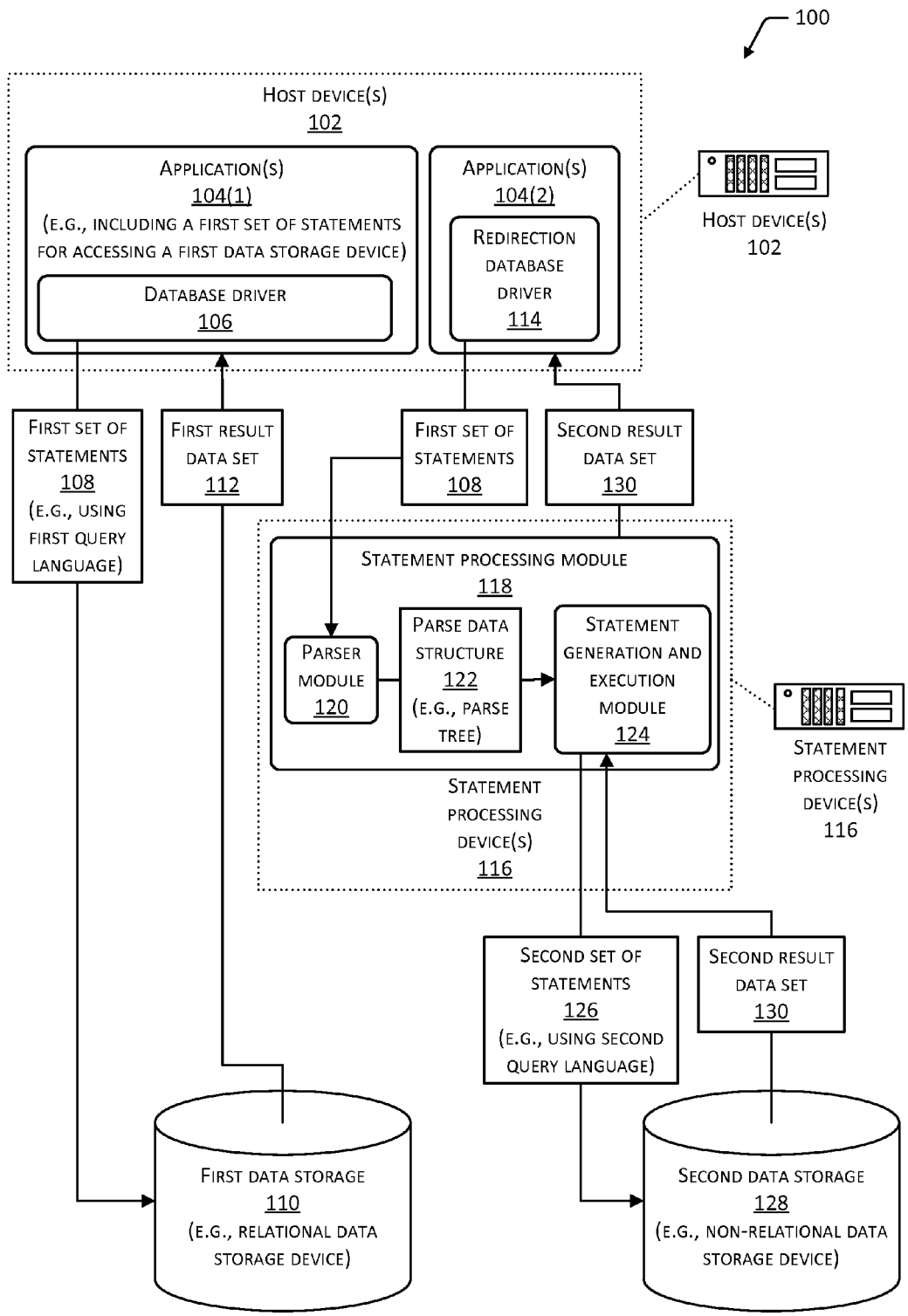
FIG. 1 depicts an environment including a statement processing device that intercepts and translates statements generated by an executing application on a host device.

FIG. 1 depicts an environment 100 for intercepting statements configured to access a first data storage, translating the statements, and executing the translated statements on a second data storage. As shown in FIG. 1, the environment 100 may include one or more host devices 102 that are configured to execute one or more application(s) 104. The host device(s) 102 may include any type of computing device, including but not limited to a server computer, a network computer, a cloud computing or distributed computing device, a personal computer, a smartphone, a tablet computer, a wearable computer, an implanted computer, a mobile gaming device, an electronic book reader, an automotive computer, a desktop computer, a laptop computer, a thin client, a terminal, a game console, a smart appliance, a home entertainment device, and so forth. Such host device(s) 102 may include substantially mobile devices (e.g., smartphones or tablet computers) or substantially less mobile devices (e.g., desktop or rack-mounted computing devices). In some cases, two or more of the host devices 102 may comprise a cluster, cloud, farm, or other grouping of multiple devices that coordinate operations to provide load balancing, failover support, parallel processing capabilities, shared storage resources, or other aspects. The host device(s) 102 are described further with reference to FIG. 3.

The host device(s) 102 may execute one or more application(s) 104 that include one or more statements for accessing a data storage. The application(s) 104 may include any type of application specified using any programming language, including but not limited to any version of: Java™ or JavaScript™, provided by Oracle™ Corporation of Redwood City, Calif., USA; C; C++; C#, developed by Microsoft™ Corporation of Redmond, Wash., USA; Perl; Python™, developed by the Python Software Foundation; BASIC; assembly language; and so forth. The application(s) 104 may be specified using a programming language that is a compiled programming language, such that the application(s) 104 are compiled into machine-executable binary code that is executable on the host device(s) 102. The application(s) 104 may also be specified using a scripting language or an interpreted programming language, such that the application(s) 104 execute within a virtual machine, runtime, or interpreter engine executing on the host device(s) 102. The application(s) 104 may be parallelized across one or more processes or threads executing on one or more host device(s) 102. The application(s) 104 may include one or more statements for accessing a data storage to retrieve data, store data, update or modify stored data, or delete data from the data storage. For example, an application 104 that is written to manage employee data records in an employee data storage may include statements to retrieve, update, and store employee information that describes an employee name, department, title, employee identification number, office location, email address, and so forth. The statements may be written using any query language. A query language may include a data manipulation language (DML) or any structured language arranged to access, retrieve, modify, add, or delete data stored in any type of data storage. The statements described herein may be specified using query languages including but not limited to any version of the Structured Query Language (SQL), Language-Integrated Query (LINQ), the Hadoop Query Language (HQL), or MapReduce.

Each statement may indicate one or more operations to be performed on stored data. For example, statements may be configured to perform operations including, but not limited to: operations to retrieve records from a dataset (e.g., select operations); operations to add new records to a dataset (e.g., insert operations); operations to modify existing records in a dataset (e.g., update operations); or operations to remove records from a dataset (e.g., delete operations). Statements may also perform operations to process records from multiple datasets in data storage, such as an inner join operation, a left outer join operation, a right outer join operation, a full outer join operation, a cross join operation, and so forth.

In some cases, the host device(s) 102 may execute a first instance of the application(s) 104(1) that incorporates a database driver 106 such as any version of a Java Database Connectivity (JDBC) driver or any version of an Open Database Connectivity (ODBC) driver. The database driver 106 may be incorporated into the application(s) 104(1) as a library, Application Programming Interface (API), or other type of software module, and may enable the application(s) 104(1) to send a first set of statements 108 to interact with a first data storage 110. The first set of statements 108 may include statements that are hard-coded or otherwise included in the specification (e.g., source code) of the application(s) 104. In some cases, the first set of statements 108 may include one or more statements specified using a first query language that is supported by the first data storage 110. For example, in cases where the first data storage 110 is a relational data storage that employs a data storage format such as that supported by the Oracle™ database management system, the first set of statements 108 may be specified using Oracle™ SQL.

The first data storage 110 may include any number of datastores, databases, or data storage systems that support any type of data storage format. In some cases, the first data storage 110 may employ a relational data storage format including one or more formally described tables, each table including one or more columns associated with data attributes. The first data storage(s) 110 may be managed through any type of relational database management system (RDBMS) software. The first data storage(s) 110 may implement a transaction model that determines how multiple operations may be processed by the first data storage(s) 110 as part of a same transaction. The first data storage(s) 110 may include any number of relational databases, including but not limited to databases managed through any of the following: Oracle™ Database and MySQL™, from Oracle™ Corporation of Redwood City, Calif., USA; DB2™, from International Business Machines™ (IBM) Corporation of Armonk, N.Y., USA; Linter™, from the RELEX Group of Voronezh, Russia; Microsoft Access™ and Microsoft SQL Server™, from Microsoft™ Corporation of Redmond, Wash., USA; PostgreSQL™, from the PostgreSQL Global Development Group; or SQLite™, from D. Richard Hipp.

The first data storage(s) 110 may also include any number of non-relational datastores that employ a non-relational data storage format and that may not comply with a relational database model. Such non-relational datastores may employ a hierarchical database model, or a network database model. The non-relational datastores may also include key-value datastores, hash tables, flat files, associative arrays, other types of data structures, or unstructured data storage. In some cases, the non-relational datastores may store metadata describing data attributes or other aspects of the stored data. The first data storage(s) 110 may include any number of non-relational datastores, including but not limited to datastores managed through any of the following: FoxPro™ database management system, from Microsoft™ Corporation of Redmond, Wash., USA; ParAccel™ Analytic Database, from ParAccel™ Incorporated of San Diego, Calif., USA; Berkeley DB from Oracle™ Corporation of Redwood City, Calif., USA; MongoDB™ from MongoDB, Inc. of New York, N.Y., USA; or Cassandra™, CouchDB™, and Hadoop™ from the Apache Software Foundation.

The first set of statements 108 may be executed on the first data storage 110 to generate a first result data set 112. The first result data set 112 may then be sent to the application(s) 104(1) executing on the host device(s) 102, enabling the application(s) 104(1) to further process the data included in the first result data set 112.

In implementations, the host device(s) 102 may execute a second instance of the application(s) 104(2) that incorporates a redirection database driver 114 that differs from the database driver 106. The application(s) 104(2) may share a same or similar design or source code specification with the application(s) 104(1), and may operate substantially similarly to the application(s) 104(1). However, during execution of the application(s) 104(2) the redirection database driver 114 may redirect the first set of statements 108 to one or more statement processing device(s) 116 instead of to the first data storage 110. The statement processing device(s) 116 may comprise any type of computing device, including but not limited to any of the types of computing devices described with reference to the host device(s) 102. In some cases, two or more of the statement processing devices 116 may comprise a cluster, cloud, farm, or other grouping of multiple devices that coordinate operations to provide load balancing, failover support, parallel processing capabilities, shared storage resources, or other aspects. The statement processing device(s) 116 are described further with reference to FIG. 4.

The statement processing device(s) 116 may execute a statement processing module 118 to receive, translate, analyze, or otherwise process the first set of statements 108. Operations of the statement processing module 118 are described further with reference to FIGS. 5-9. In some implementations, the statement processing module 118 may include a parser module 120. The parser module 120 may operate to parse the first set of statements 108 based on a grammar for the first query language in which the first set of statements 108 are specified. The parser module 120 may generate a parse data structure 122, such as a parse tree, that describes one or more data access operations specified in the first set of statements 108. The parse data structure 122 may be provided to a statement generation and execution module 124, which generates a second set of statements 126. The second set of statements 126 may include one or more statements that are specified using a second query language that is different from the first query language of the first set of statements 108. In this way, the statement processing module 118 may translate the first set of statements 108 from a first query language to a second query language.

The statement generation and execution module 124 may execute the second set of statements 126 on a second data storage 128 that supports the second query language. The second data storage 128 may be a relational or a non-relational data storage, and may store data using any data storage format including a relational or non-relational data storage format. The second data storage 128 may include any number of databases, datastores, or data storage systems that are operated through any of the data storage management systems described above with reference to the first data storage 110. A second result data set 130 may be generated based on the execution of the second set of statements 126. The second result data set 130 may be received by the statement processing module 118 and sent to the application(s) 104(2) executing on the host device(s) 102, enabling the application(s) 104(2) to further process the data included in the second result data set 130. In some cases, the statement processing module 118 may perform one or more operations to reformat or otherwise process the second result data set 130 prior to sending the second result data set 130 to the application(s) 104(2). For example, the second result data set 130 may be reorganized into a format similar to a format in which the first result data set 112 is generated.

In some cases the execution of the application(s) 104(1) and the application(s) 104(2) may be monitored to determine any differences in behavior between the application(s) 104(1) and the application(s) 104(2) after respectively receiving the first result data set 112 and the second result data set 130. Any detected differences in behavior may enable a determination of the feasibility or cost of modifying the application(s) 104 to interact with the second data storage 128 instead of the first data storage 110. Such information may be used in planning for a data migration when large quantities of data may be migrated from storage on the first data storage 110 to the second data storage 128.

In some cases, the first data storage 110 may employ a different data storage format compared to the second data storage 128. For example, the first data storage 110 may employ a relational data storage format and the second data storage 128 may employ a non-relational data storage format. As another example, the first data storage 110 may employ a non-relational data storage format and the second data storage 128 may employ a relational data storage format. In such cases, implementations may enable the dynamic and automatic translation of statements that are configured to access data stored in a first data storage format, to generate statements that are configured to access data stored in a second data storage format. In some cases, the first set of statements 108 may be described using a version of SQL to accessing a relational database, and the second set of statements 126 may be described using a query language for accessing a non-relational datastore such as a key-value store.

Implementations also support statement translation in cases where the first data storage 110 and the second data storage 128 both support a similar data storage format (e.g., are both relational databases), but that support different query languages. For example, the first data storage 110 may be a relational database that supports a first version of SQL and the second data storage 128 may be a relational database that supports a second, different version of SQL. In such cases, statement translation may be performed to translate the first set of statements 108 from the first version to the second version of SQL. Although the example of FIG. 1 depicts two data storages, the environment 100 may include any number of data storages of any type that support any data storage format or any query language.

In some cases, the first data storage 110 may implement a different transaction model compared to the second data storage 128. For example, the first data storage 110 may order two or more insert, update, or delete statements issued concurrently, and the second data storage 128 may interleave these statements. In cases where the first data storage 110 and the second data storage 128 implement different transaction models, the application(s) 104(s) may exhibit errors, failures, exceptions, or other aberrant behavior on receiving the second result data set 130. For example, in some cases the second data storage 128 may be a NoSQL datastore or some other data storage that does not support transactional processing or the set of features for Atomicity, Consistency, Isolation, and Durability (ACID) that may be supported by a relational database. In such cases, and where multiple applications 104 may attempt to alter the same data simultaneously or otherwise be configured to expect transactional processing, errors in data processing may occur.

Although the first data storage 110 and the second data storage 128 are depicted in FIG. 1 as separate devices from the other entities in the environment 100, implementations are not so limited. In some cases, one or both of the first data storage 110 and the second data storage 128 may be a data storage service executing on one or more computing devices which may include the statement processing device(s) 116, the host device(s) 102, or other devices.

The various devices of the environment 100 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, communications between the various devices in the environment 100 may be encrypted or otherwise secured. For example, such communications may employ one or more public or private cryptographic keys, digital certificates, or other credentials supported by a security protocol such as any version of the Secure Sockets Layer (SSL) protocol, the Transport Layer Security (TLS) protocol, or the Advanced Encryption Standard (AES).

Figure 2:
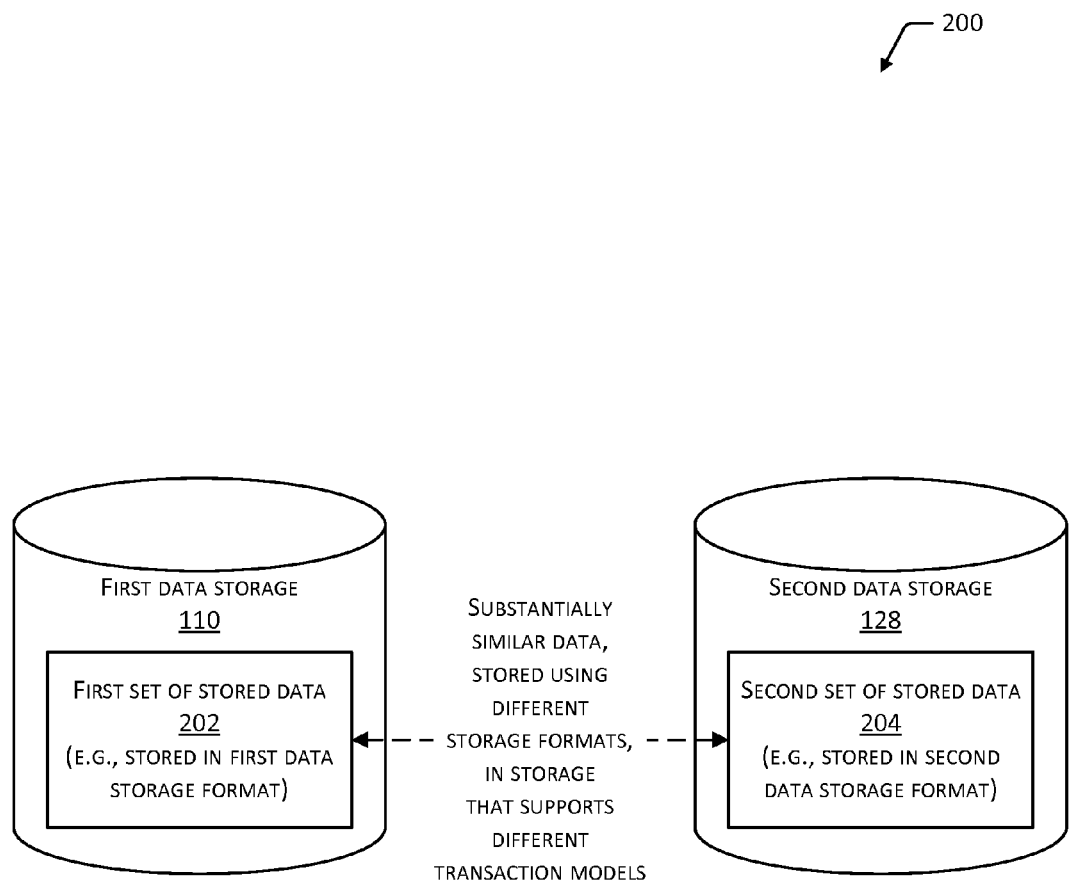
FIG. 2 depicts a schematic of two data storage devices or services that store substantially similar data using different data storage formats, the two data storages supporting different transaction models or different query languages.

FIG. 2 depicts an example schematic 200 showing the first data storage 110 and the second data storage 128. In some cases, the first data storage 110 may store a first set of stored data 202 in a first data storage format supported by the first data storage 110. For example, the first data storage format may be that of a relational database as described above. The second data storage 128 may store a second set of stored data 204 in a second data storage format supported by the second data storage 128. The second data storage format may be different from the first data storage format. For example, the second data storage format may be that of a non-relational datastore such as a key-value store or a modified key-value store. In some implementations, the second set of stored data 204 may be substantially similar data to at least a portion of the first set of stored data 202. For example, the first set of stored data 202 may include tables A, B, C, and D in a relational database format. The second set of stored data 204 may include a dataset that stores the data of tables B and C in a key-value storage format instead of in a relational database format. In this way, implementations may enable the testing of the application(s) 104 to compare the original, unmodified behavior of the application(s) 104 to the behavior when the statements generated by the application(s) 104 are intercepted, translated, and redirected to a different type of data storage. In some cases, the first data storage 110 and the second data storage 128 implement different transaction models for transaction processing of multiple operations as described above.

Figure 3:
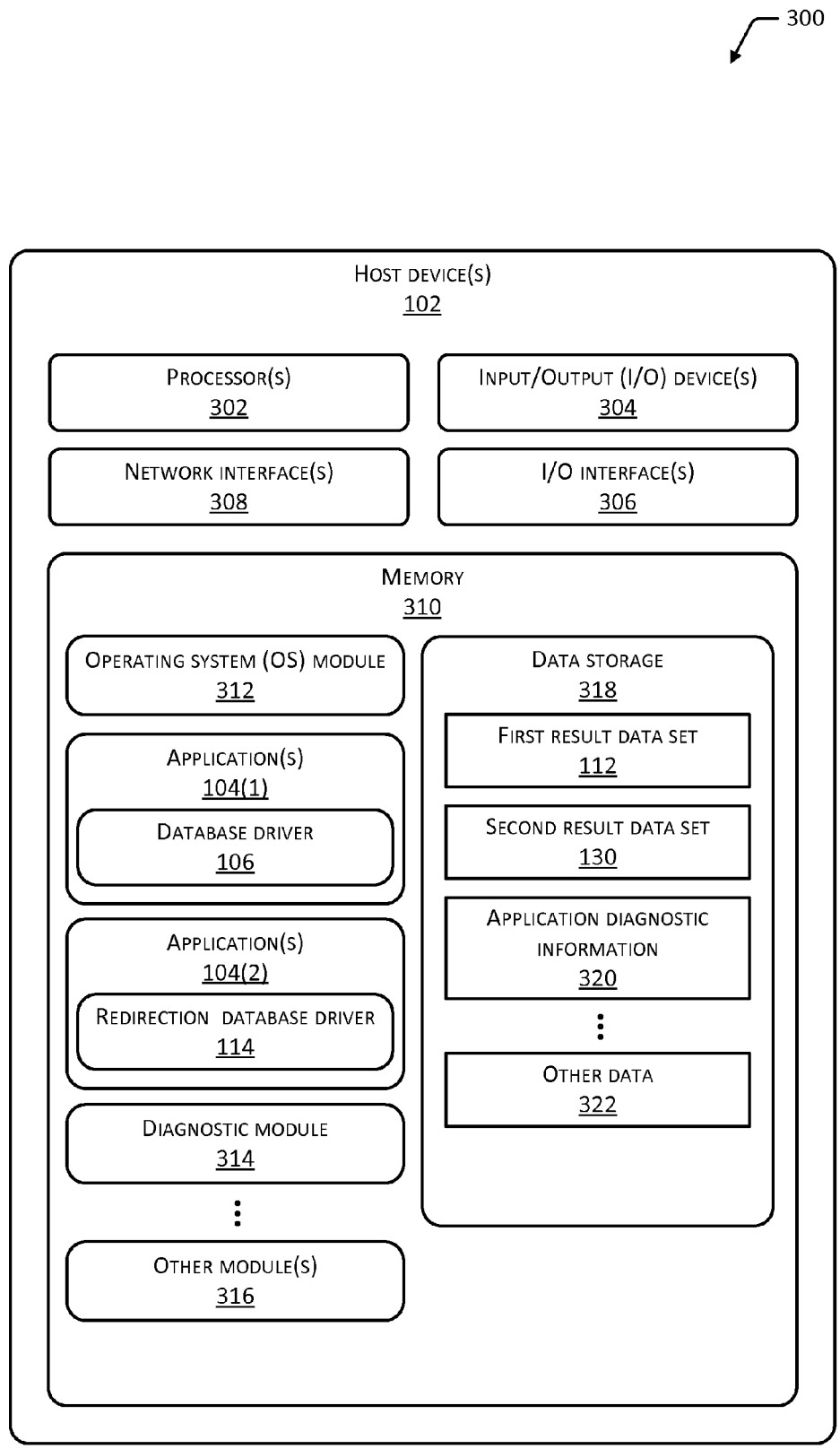
FIG. 3 depicts a block diagram of an example host device on which an application may execute to generate statements.

FIG. 3 depicts a block diagram 300 of an example of the host device(s) 102. As shown in the block diagram 300, the host device 102 may include one or more processors 302 configured to execute one or more stored instructions. The processor(s) 302 may comprise one or more cores, and may be hardware processor(s) such as one or more central processing units (CPUs).

The host device 102 may include one or more input/output (I/O) devices 304. The I/O device(s) 304 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 304 may also include output devices such as a display, an audio output device (e.g., a speaker), a printer, a haptic output device, and so forth. The I/O device(s) 304 may be physically incorporated with the host device 102, or may be externally placed.

The host device 102 may include one or more I/O interfaces 306 to enable components or modules of the host device 102 to control, interface with, or otherwise communicate with the I/O device(s) 304. The I/O interface(s) 306 may enable information to be transferred in or out of the host device 102, or between components of the host device 102, through serial communication, parallel communication, or other types of communication. For example, the I/O interface(s) 306 may comply with a version of the RS-232 standard for serial ports, or with a version of the Institute of Electrical and Electronics Engineers (IEEE) 1284 standard for parallel ports. As another example, the I/O interface(s) 306 may be configured to provide a connection over Universal Serial Bus (USB) or Ethernet. In some cases, the I/O interface(s) 306 may be configured to provide a serial connection that is compliant with a version of the IEEE 1394 standard. The host device 102 may also include one or more busses or other internal communications hardware or software that allow for the transfer of data between the various modules and components of the host device 102.

The host device 102 may include one or more network interfaces 308 that enable communications between the host device 102 and other network accessible computing devices such as the statement processing device(s) 116. The network interface(s) 308 may include one or more network interface controllers (NICs) or other types of transceiver devices configured to send and receive communications over a network.

The host device 102 may include one or more memories, described herein as memory 310. The memory 310 comprises one or more computer-readable storage media (CRSM). The CRSM may include one or more of an electronic storage medium, a magnetic storage medium, an optical storage medium, a quantum storage medium, a mechanical computer storage medium, and so forth. The memory 310 provides storage of computer-readable instructions that may describe data structures, program modules, processes, applications, or other data for the operation of the host device 102. In some implementations, the memory 310 may provide storage of computer-readable instructions or other information in a non-transitory format.

The memory 310 may include an operating system (OS) module 312. The OS module 312 may be configured to manage hardware resources such as the I/O device(s) 304, the I/O interface(s) 306, and the network interface(s) 308, and to provide various services to applications, processes, or modules executing on the processor(s) 302. The OS module 312 may include one or more of the following: any version of the Linux™ operating system; any version of iOS™ from Apple™ Corp. of Cupertino, Calif., USA; any version of Windows™ or Windows Mobile™ from Microsoft™ Corp. of Redmond, Wash., USA; any version of Android™ from Google™ Corp. of Mountain View, Calif., USA and its derivatives from various sources; any version of Palm OS™ from Palm Computing™, Inc. of Sunnyvale, Calif., USA and its derivatives from various sources; any version of BlackBerry OS™ from Research In Motion™ Ltd. of Waterloo, Ontario, Canada; any version of VxWorks™ from Wind River Systems™ of Alameda, Calif., USA; or other operating systems.

The memory 310 may include one or more of the modules described above as executing on the host device 102, such as the application(s) 104. As described above, the memory 310 may include a first instance of the application(s) 104(1) that incorporate the database driver 106, e.g., for interacting with the first data storage 110. The memory 310 may also include a second instance of the application(s) 104(2) that incorporates the redirection database driver 114, which redirects statements from the application(s) 104(2) to the statement processing device(s) 116. In some implementations, the memory 310 may include a diagnostic module 314 configured to collect information regarding the behavior of the application(s) 104 during execution. For example, the diagnostic module 314 may detect errors, failures, exceptions, or other problems exhibited by the application(s) 104. The diagnostic module 314 may also be configured to compare the first result data set 112 and the second result data set 130, to detect potential problems associated with a data migration from the first data storage 110 to the second data storage 128, or to identify other issues. The memory 310 may also include one or more other modules 316, such as a user authentication module or an access control module to secure access to the host device 102, and so forth.

The memory 310 may include data storage 318 to store data for operations of the host device 102. The data storage 318 may comprise a database, array, structured list, tree, or other data structure, and may be a relational or a non-relational datastore. The data storage 318 may store data such as that described above as being stored on or employed by the host device 102, including one or more of the first result data set 112 or the second result data set 130. In some implementations, the data storage 318 may store application diagnostic information 320 that describes how one or both of the application(s) 104(1) and the application(s) 104(2) behavior during execution. For example, the application diagnostic information 320 may describe errors, failures, exceptions, or other problems exhibited during execution. The application diagnostic information 320 may also include memory dumps, stack traces, communications logs, or other information to enable one or more users to examine the behaviors of the application(s) 104. The application diagnostic information 320 may be generated by the diagnostic module 314. The data storage 318 may also store other data 322, such as user authentication information or access control data. In some implementations, at least a portion of the information stored in the data storage 318 may be stored externally to the host device 102, on other devices that may communicate with the host device 102 via the I/O interface(s) 306 or via the network interface(s) 308.

Figure 4:
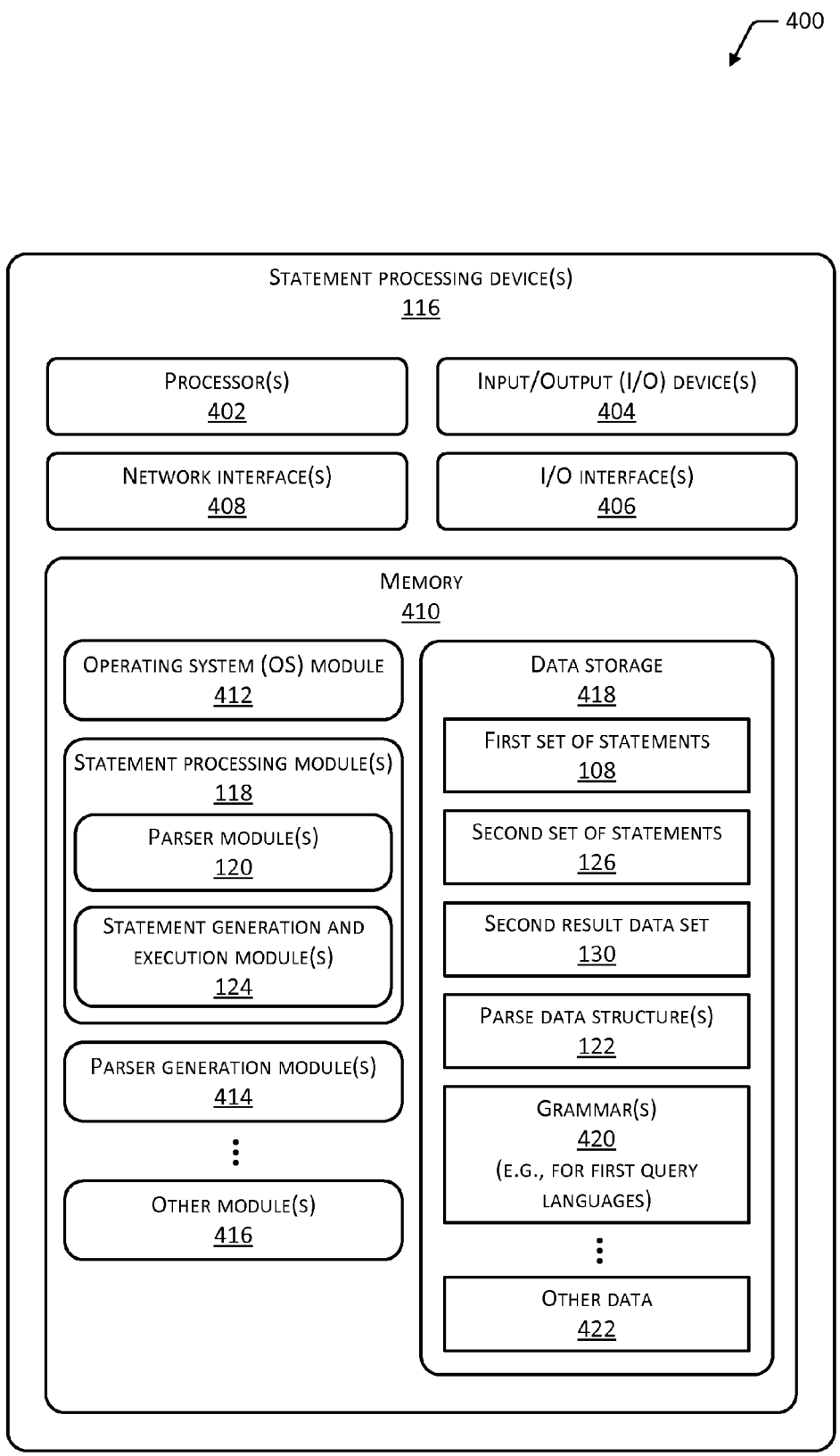
FIG. 4 depicts a block diagram of an example statement processing device configured to intercept and translate statements.

FIG. 4 depicts a block diagram 400 of an example of the statement processing device(s) 116. As shown in the block diagram 400, the statement processing device 116 may include one or more processors 402 configured to execute one or more stored instructions. The processor(s) 402 may comprise one or more cores, and may be hardware processor(s) such as one or more CPUs. The statement processing device 116 may include one or more I/O devices 404, one or more I/O interfaces 406, and one or more network interfaces 408 as described above respectively with reference to the I/O device(s) 304, the I/O interface(s) 306, and the network interface(s) 308.

The statement processing device 116 may include one or more memories, described herein as memory 410. The memory 410 comprises one or more CRSM, as described above with reference to the memory 310. The memory 410 may include an OS module 412 that is configured to manage hardware resources such as the I/O device(s) 404, the I/O interface(s) 406, and the network interface(s) 408, and to provide various services to applications, processes, or modules executing on the processor(s) 402. The OS module 412 may include one or more of the operating systems described above with reference to the OS module 312. The memory 410 may include one or more of the modules described above as executing on the statement processing device 116, such as the statement processing module 118, the parser module 120, and the statement generation and execution module 124. Although the examples herein may describe the parser module 120 and the statement generation and execution module 124 as sub-modules, sub-components, or sub-processes of the statement processing module 118 (e.g., as shown in FIG. 4), implementations are not so limited. In some cases, one or both of the parser module 120 and the statement generation and execution module 124 may execute separately from the statement processing module 118.

In some implementations, the memory 410 may include one or more parser generation modules 414 that generate one or more parser module(s) 120. The parser generation module 414 may generate at least one parser module 120 for each query language used to specify the first set of statements 108. Implementations support the use of any parser generation module 414 to generate the parser module(s) 120, including but not limited to the CUP parser generator supported by the Technical University of Munich or the Java Compiler Compiler™ (JavaCC™) from Oracle™ Corporation of Redwood City, Calif., USA. The parser generation module 414 may receive, as input, a grammar specification for one or more query languages and generate a parser module 120 corresponding to each of the grammars. For example, the parser generation module 414 may access a grammar for a version of SQL and output a parser module 120 that parses statements written in that version of SQL. The parser generation module 414 may also access a grammar for a version of HQL and output a parser module 120 that parses statements written in that version of HQL. Accordingly, the memory 410 may store any number of parser modules 120 configured to parse any number of query languages.

In some cases, the memory 410 may store a statement processing module 118 that includes multiple parser modules 120 to parse statements received in multiple query languages. Alternatively, the memory 410 may store a plurality of statement processing modules 118 that each includes a parser module 120 to parse statements received in a particular query language. The memory 410 may also include one or more other modules 416, such as a user authentication module or an access control module to secure access to the statement processing device 116, and so forth.

The memory 410 may include data storage 418 to store data for operations of the statement processing device 116. The data storage 418 may comprise a database, array, structured list, tree, or other data structure, and may be a relational or a non-relational datastore. The data storage 418 may store data such as that described above, including one or more of the first set of statements 108, the second set of statements 126, the second result data set 130, or the parse data structure(s) 122. The data storage 418 may also store one or more grammars 420 to be input to the parser generation module 414, to generate the parser module(s) 120 for each of one or more query languages employed by the first set of statements 108 to be translated. In some cases, the grammar(s) 420 may include context-free grammar(s) described using the Backus-Naur Form or the Backus Normal Form (BNF) for grammars. The data storage 418 may also store other data 422, such as user authentication information or access control data. In some implementations, at least a portion of the information stored in the data storage 418 may be stored externally to the statement processing device 116, on other devices that may communicate with the statement processing device 116 via the I/O interface(s) 406 or via the network interface(s) 408.

Figure 5:
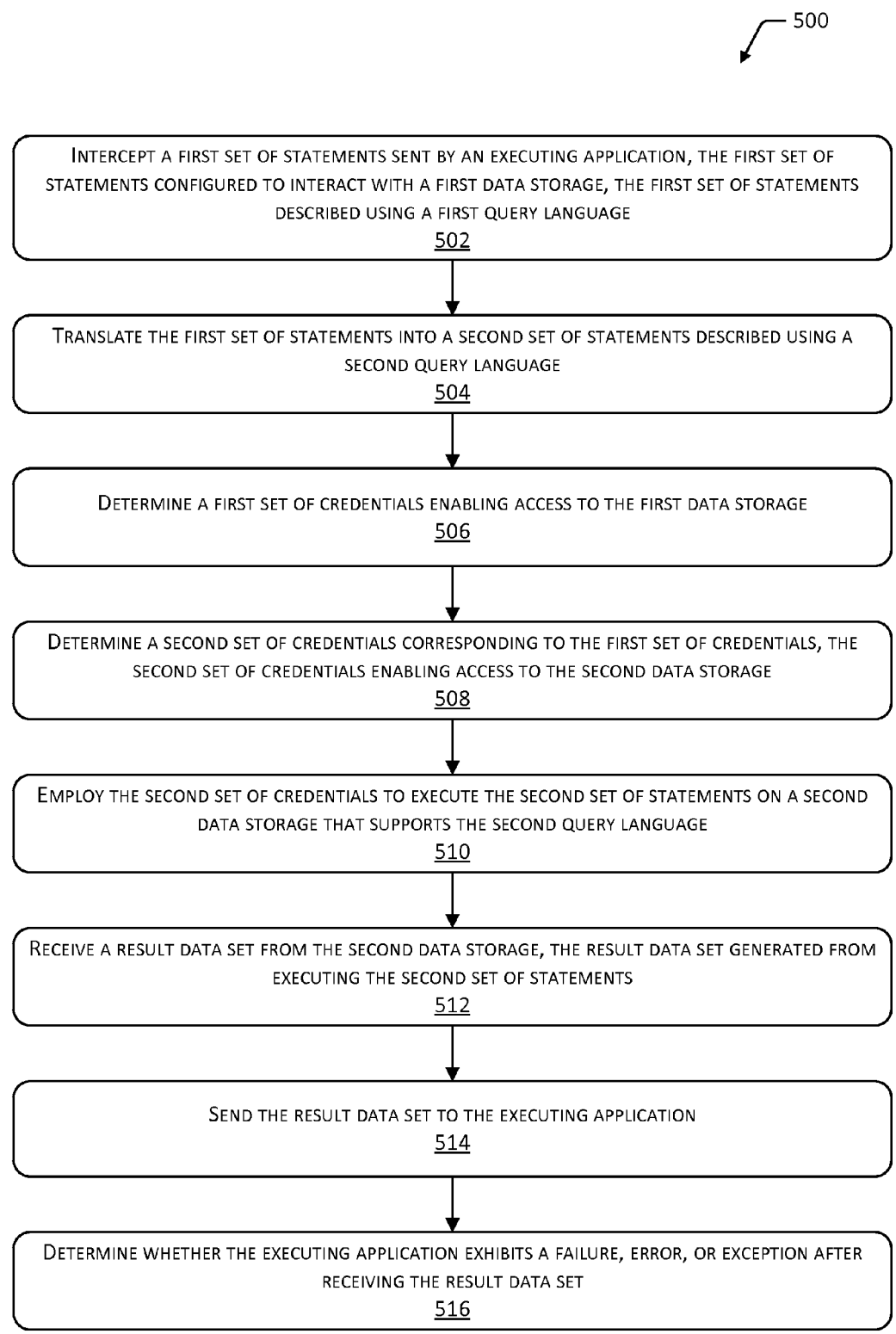
FIG. 5 depicts a flow diagram of a process for intercepting a first set of statements, translating the first set of statements into a second set of statements that employs a different query language than the first set of statements, and executing the second set of statements on a data storage that supports the different query language.

FIG. 5 depicts a flow diagram 500 of a process for intercepting the first set of statements 108, translating the first set of statements 108 into a second set of statements 126 that employs a different query language than the first set of statements 108, and executing the second set of statements 126 on the second data storage 128 that supports the different query language. One or more operations of the process may be performed by the statement processing module 118, the parser module 120, the statement generation and execution module 124, other modules executing on the statement processing device(s) 116, the diagnostic module 314, other modules executing on the host device(s) 102, or other modules executing on other devices.

At 502, the first set of statements 108 may be intercepted or otherwise received. The first set of statements 108 may be sent by an executing process such as the application(s) 104(2), and may be configured to interact with a first data storage 110 that is implemented as hardware, software, or a combination of hardware and software. As described above, the first set of statements 108 may be described using a first query language that is supported by the first data storage 110.

At 504, the first set of statements 108 may be translated from the first query language to a second query language, to generate the second set of statements 126 described using the second query language. The translation is described further with reference to FIG. 7.

At 506, in some implementations a first set of credentials may be determined, the first set of credentials providing access to the first data storage 110. The first set of credentials may include a login, password, digital certificate, token, or any other type of credential. In some cases, the first set of credentials may be included in the first set of statements 108. Alternatively, the first set of credentials may be employed to establish a connection with the first data storage 110.

At 508, a second set of credentials may be determined that enable access to the second data storage 128 that is implemented as hardware, software, or a combination of hardware and software. In some cases, the second set of credentials may correspond to the first set of credentials in that they provide access to the two storage devices for a same user, a same device, or a same process. In some implementations, the second set of credentials may be determined based on mapping data that describes a correspondence between the first and second sets of credentials. In some implementations, the second set of credentials may be determined through a call to Lightweight Directory Access Protocol (LDAP) service, credentialing service, or some other service. Such a service may execute on the statement processing device(s) 116 or on another device. In some cases, one or both of the first set of credentials and the second set of credentials may be included in a configuration file that is present on, or accessible from, the host device(s) 102 or the statement processing device(s) 116.

At 510, the second set of credentials may be employed to execute the second set of statements 126 on the second data storage 128. At 512, the second result data set 130 generated from executing the second set of statements 126 may be received. In some implementations, the second result data set 130 may be modified, reformatted, or otherwise processed at 512. For example, the second result data set 130 may be modified such that its format resembles a format corresponding to the first result data set 112. At 514, the second result data set 130 may be sent to the executing application(s) 104(2). In some cases, the second set of credentials may be employed to establish an authenticated connection or communication session between the statement processing device(s) 116 and the second data storage 128. Alternatively, the second set of credentials may be included with one or more of the second set of statements 126, and may be employed to authenticate the statement(s).

At 516, a determination may be made whether the executing application(s) 104(2) exhibit a failure, error, exception, or other problem after receiving the second result data set 130. Such a problem may indicate potential complications in refactoring or modifying the source code of the application(s) 104 to access a different type of data storage. For example, the application(s) 104 may be written such that it expects one or more statements to be executed within a transactional block by a data storage, and such transactional processing may not be supported by the second data storage 128. In such cases, a transaction-based failure of the application(s) 104(2) may expose transactional processing as a potential problem to be addressed during refactoring of the source code for the application(s) 104.

Figure 6:
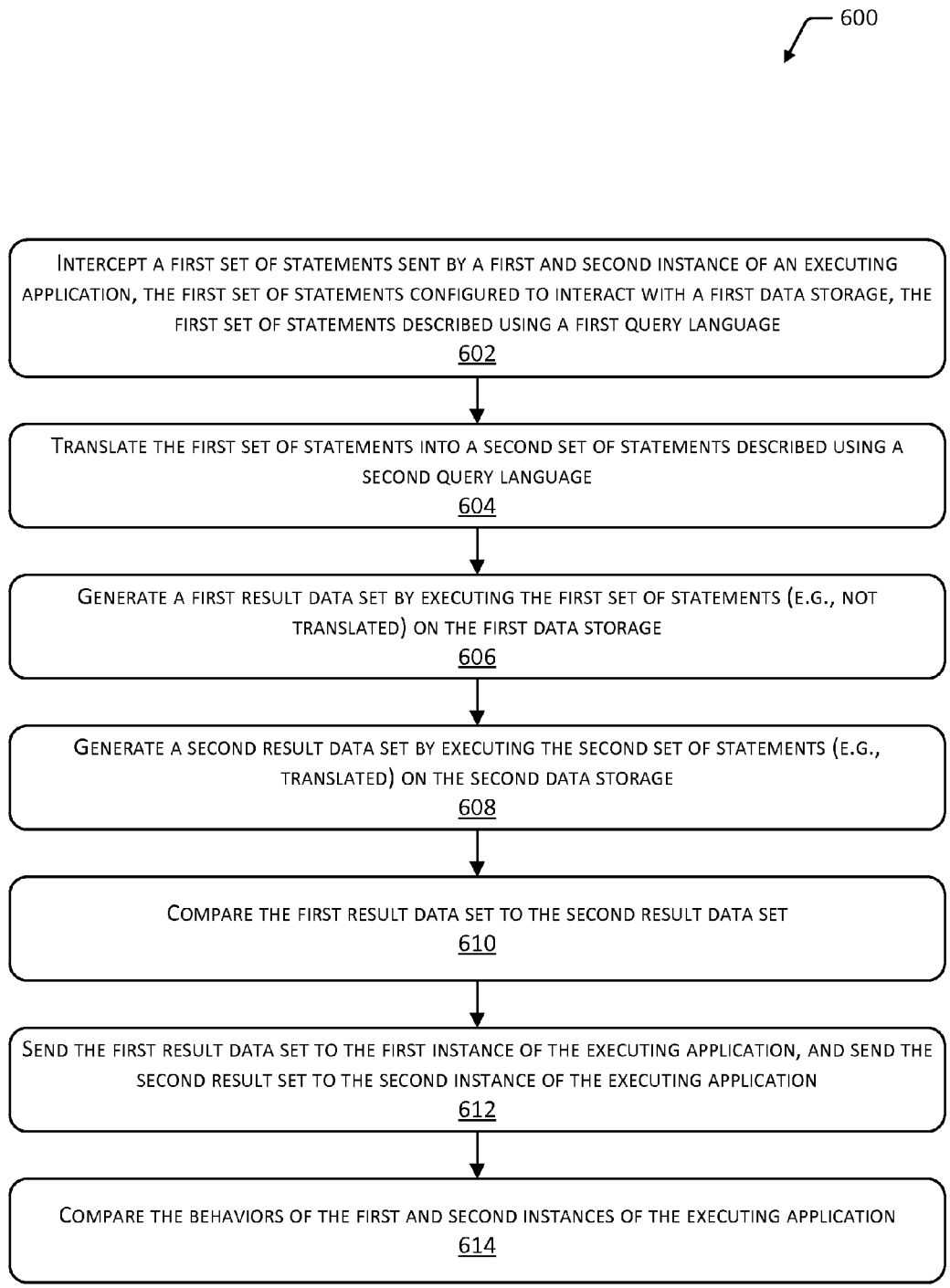
FIG. 6 depicts a flow diagram of a process for comparing the results of executing a first set of statements and a second set of statements respectively against a first data storage and a second data storage, the first set of statements having been intercepted and translated into a second set of statements that employs a different query language.

FIG. 6 depicts a flow diagram 600 of a process for comparing the results of executing the first set of statements 108 and the second set of statements 126 respectively on the first data storage 110 and the second data storage 128. One or more operations of the process may be performed by the statement processing module 118, the parser module 120, the statement generation and execution module 124, other modules executing on the statement processing device(s) 116, the diagnostic module 314, other modules executing on the host device(s) 102, or other modules executing on other devices.

At 602, the first set of statements 108 sent by the application(s) 104(1) and sent by the application(s) 104(2) may be intercepted or otherwise accessed, as described above with reference to 502. At 604, the first set of statements 108 may be translated from a first query language supported by the first data storage 110 to a second query language supported by the second data storage 128, to generate the second set of statements 126 as described above.

At 606, the first result data set 112 may be generated by executing the first set of statements 108 (e.g., the original, not translated statements) on the first data storage 110. At 608, the second result data set 130 may be generated by executing the second set of statements 126 (e.g., the translated statements) on the second data storage 128. The first result data set 112 may be received by the executing application(s) 104(1), and the second result data set 130 may be sent to the executing application(s) 104(2) as described above. In some implementations, the generation of the first result data set 112 (e.g., at 606) may be performed at least partly in parallel with the generation of the second result data set 130 (e.g., at 608), such that the first set of statements 108 and the second set of statements 126 are executed to access data that is substantially similar within a particular time period.

At 610, the first result data set 112 may be compared to the second result data set 130. In some cases, differences between the two result data sets may indicate problems associated with migrating data from the first data storage 110 to the second data storage 128. Differences between the two result data sets may also indicate problems that may be encountered when refactoring or otherwise modifying the source code of the application(s) 104 to access the second data storage 128. Such differences may be reported to one or more users for further investigation.

At 612, the first result data set 112 and the second result data set 130 may respectively be sent to the application(s) 104(1) and the application(s) 104(2). At 614, the behaviors of the application(s) 104(1) and the application(s) 104(2) may be compared, and differences in behavior may be reported to one or more users for further investigation. In some cases, differences in behavior may indicate problems to be addressed when refactoring or otherwise modifying the source code of the application(s) 104 to access the second data storage 128.

Some implementations may perform operations (e.g., at 610) to compare the first result data set 112 and the second result data set 130 and may omit the operations (e.g., at 614) to compare the behaviors of the first and second instances of the executing application 104. In such implementations, the second instance of the application 104(2) may be executing, and the first instance of the application 104(1) may not be executing. The first set of statements 108 may, in such implementations, be intercepted from the second instance of the application 104(2) at 602, and not from the first instance of the application 104(1).

Figure 7:
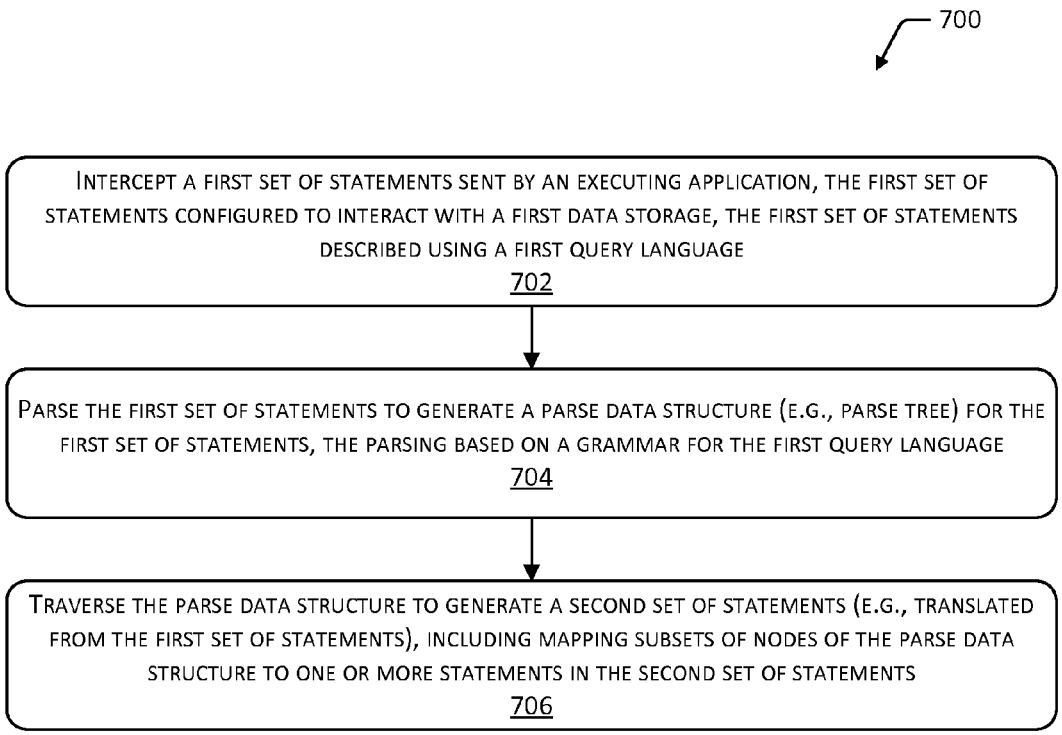
FIG. 7 depicts a flow diagram of a process for translating a first set of statements into a second set of statements by parsing the first set of statements based on a grammar for the query language supported by the first set of statements.

FIG. 7 depicts a flow diagram 700 of a process for translating the first set of statements 108 into the second set of statements 126 by parsing the first set of statements 108 based on the grammar 420 for the query language supported by the first set of statements 108. One or more operations of the process may be performed by the statement processing module 118, the parser module 120, the statement generation and execution module 124, other modules executing on the statement processing device(s) 116, or other modules executing on other devices.

At 702, the first set of statements 108 sent by the application(s) 104(2) may be intercepted or otherwise accessed, as described above with reference to 502. At 704, the first set of statements 108 may be parsed to generate the parse data structure 122. In some cases, the parse data structure 122 may be a parse tree or a modified parse tree exhibiting any branching factor. Implementations also support the use of other types of data structures. The parse data structure 122 may describe one or more data access operations indicated by the first set of statements 108. As described above, the parsing may be performed by a parser module 120 that is generated based on a grammar 420 for the first query language employed by the first set of statements 108.

At 706, the parse data structure 122 may be traversed and each of the data access operations may be analyzed and processed to generate the second set of statements 126. Such processing may include mapping one or more subsets of the nodes of the parse data structure 122 to one or more statements to be included in the second set of statements 126. The second set of statements 126 may then be executed on the second data storage 128 as described above.

Figure 8:
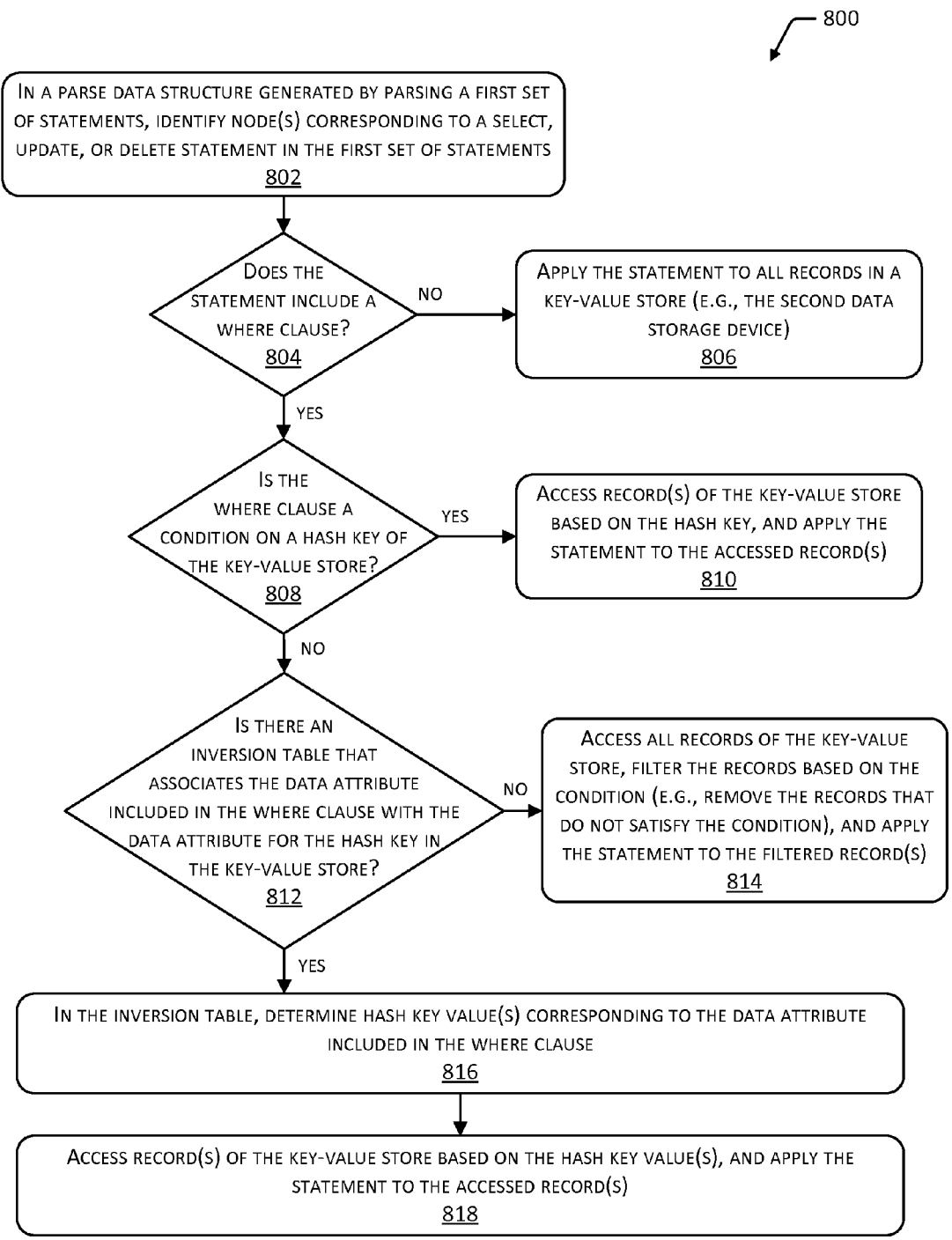
FIG. 8 depicts a flow diagram of a process for translating a statement of the first set of statements, the statement including less than two conditions.
Figure 9:
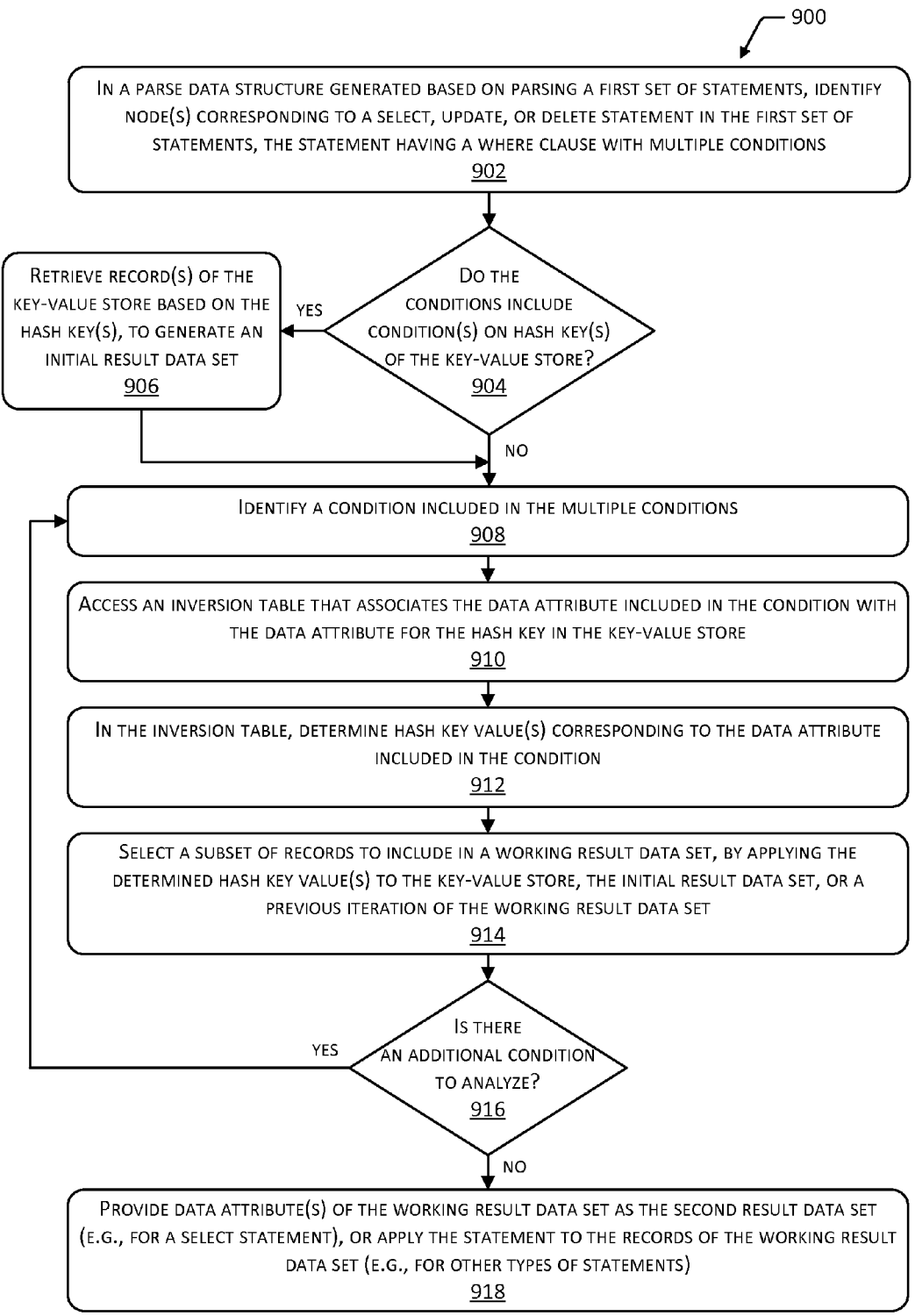
FIG. 9 depicts a flow diagram of a process for translating a statement of the first set of statements, the statement including two or more conditions.

FIGS. 8 and 9 illustrate examples of the processing of the parse data structure 122 to generate the second set of statements 126 and to generate the second result data set 130 based on execution of the second set of statements 126. In the examples of FIGS. 8 and 9, the first set of statements 108 include one or more SQL statements configured to access data stored on the first data storage 110, which includes a relational database. The second data storage 128 includes a key-value store that includes one or more datasets, each dataset including a hash key that may be used to search the dataset. In some cases, the second data storage 128 may be a modified key-value store in which each dataset also includes a range key that may be employed in range-based searches of the dataset. The examples of FIGS. 8 and 9 are not limiting of implementations, which support any type of data storage format employed by the first data storage 110 and the second data storage 128.

The examples of FIGS. 8 and 9 reference two example datasets. The first dataset is named "employees," and may include any number of records each providing information describing an employee. In the example, the "employees" dataset includes four columns, "employee_ID," "first_name," "last_name," and "department_ID," with "employee_ID" being the hash key that is a searchable column of the dataset. The second dataset is named "departments," and may include any number of records each providing information describing a department of a business or other organization. In the example, the "departments" dataset includes two columns, "department_ID" and "department_name," with "department_ID" being the hash key for the dataset. The "employees" and "departments" datasets in the key-value store may include the second set of stored data 204 that has been migrated (e.g., copied and reformatted) from the first set of stored data 202 that includes two relational database tables "employees" and "departments." Accordingly, the second set of stored data 204 may store substantially similar data to the first set of stored data 202, in a different data storage format.

FIG. 8 depicts a flow diagram 800 of a process for translating a statement of the first set of statements 108, the statement including less than two conditions (e.g., zero or one conditions in a where clause). One or more operations of the process may be performed by the statement processing module 118, the parser module 120, the statement generation and execution module 124, other modules executing on the statement processing device(s) 116, or other modules executing on other devices.

At 802, the parse data structure 122 is accessed, and a set of one or more nodes may be identified as corresponding to a SQL statement. As described above, the parse data structure 122 may be a parse tree generated by parsing the first set of statements 108. In the example of FIG. 8, the set of nodes may correspond to a select statement, an update statement, or a delete statement, specified according to any version of SQL.

At 804, a determination is made whether the statement includes a where clause to apply a condition to the select, update, or delete statement. If not, the process may proceed to 806. Statements that do not include a where clause may be statements such as "select * from employees" or "delete from departments," which may operate against all records of the dataset corresponding to the relational database table "employees" or "departments."

At 806, the statement may be applied to all of the records in the dataset of the key-value store that is referenced in the statement. For example, based on a SQL statement of "select * from employees" a statement of the second set of statements 126 may be generated to retrieve all the records of the "employees" dataset in the key-value store. In that case, the second result data set 130 may include all records from the "employees" dataset. As another example, based on a SQL statement of "delete from employees" a statement of the second set of statements 126 may be generated to delete all the records of the "employees" dataset in the key-value store. In that case the second result data set 130 may be empty or null. As another example, based on a SQL statement of "update employees set last_name='Smith'" a statement of the second set of statements 126 may be generated to modify all the records of the "employees" dataset in the key-value store and set each "last_name" value to "Smith." In that case the second result data set 130 may be empty or null.

If it is determined at 804 that the statement includes a where clause with one condition, the process may proceed to 808. At 808, a determination is made whether the where clause is a condition on a hash key of the key-value store, such as in the statement "select first_name from employees where employee_ID=55." If so, the process may proceed to 810. At 810, the one or more records of the key-value store are accessed based on the hash key, and the statement may be applied to the accessed records. In the above example "select first_name from employees where employee_ID=55," a statement of the second set of statements 126 may be generated to retrieve the values of the data attribute "first_name" from the "employees" dataset, for all records that have the hash key equal to 55. The second result data set 130 may then include the "first_name" values of all such records. As another example, based on a SQL statement of "update employees set first_name='Austin' where employee_ID=55," a statement of the second set of statements 126 may be generated to modify all such records to set the "first_name" value to "Austin." In that case, the second result data set 130 may be empty or null.

If it is determined at 808 that the condition of the where clause is not on a hash key of the key-value store, such as in the statement "select first_name from employees where last_name='Smith'," the process may proceed to 812. At 812, a determination is made whether there is an inversion table that associates the data attribute included in the where clause with the data attribute for the hash key in the key-value store, e.g., if the where clause is a condition on the hash key of an existing inversion table. If so, the process may proceed to 816. If not, the process may proceed to 814. At 814, all records of the key-value store may be accessed and filtered based on the condition in the where clause. Such filtering may include removing those records that do not satisfy the condition. The statement may then be applied to the filtered record(s).

If it is determined at 812 that an appropriate inversion table exists, the inversion table may be accessed that associates the data attribute included in the where clause with the data attribute for the hash key in the key-value store. In the above example "select first_name from employees where last_name='Smith'," an inversion table may be accessed that maps "last_name" to "employee_ID." Any number of such inversion tables may be stored in the second set of stored data 204 in the second data storage 128. In some cases, the inversion table(s) may be created through pre-processing of the second set of stored data 204 prior to the dynamic statement translation operations described herein. In cases where the first data storage 110 is a relational database managed through RDBMS, indices present in the first data storage 110 may be employed to create the inversion table(s) that are included in the second data storage 128.

At 816, the inversion table may be employed to determine one or more hash key value(s) that correspond to the data attribute included in the where clause. At 818, one or more records of the key-value store may be accessed based on the hash key value(s) determined at 816, and the statement may be applied to each of the accessed record(s) as described above.

Implementations support the application of where clauses in which the condition is an equality condition on a data attribute that is a hash key of the key-value store, or on a data attribute that is not a hash key. For example, implementations support the application of a condition data attribute=value. Some implementations also support the application of other types of conditions. In some cases, where the condition to be applied is a range of values (e.g., value1<data attribute<value2), implementations may translate the condition over a range to a plurality of equality conditions applied to discrete values of the data attribute included in the condition. In cases where the key-value store includes a range key as well as a hash key, such range-based conditions may be applied to the range key. In some cases where the condition to be applied is not an equality condition, all records of the key-value store may be retrieved and filtered to apply the condition.

FIG. 9 depicts a flow diagram 900 of a process for translating a statement of the first set of statements 108, the statement including two or more conditions on data attributes of a same dataset or different datasets (e.g., as an join statement). One or more operations of the process may be performed by the statement processing module 118, the parser module 120, the statement generation and execution module 124, other modules executing on the statement processing device(s) 116, or other modules executing on other devices.

At 902, the parse data structure 122 is accessed, and a set of one or more nodes may be identified as corresponding to a SQL statement. As described above, the parse data structure 122 may be a parse tree generated by parsing the first set of statements 108. In the example of FIG. 9, the set of nodes may correspond to a select statement, an update statement, or a delete statement that includes a where clause having two or more conditions.

At 904, a determination may be made whether the conditions include one or more conditions on hash key(s) of the targeted dataset in the key-value store. If so, the process may proceed to 906 and retrieve one or more records of the key-value store based on the hash key(s), to generate an initial result data set. By applying the condition on the hash key(s) first in the process, implementations may reduce the number of records to be used in the subsequent application of the other conditions of the where clause. In some implementations, further analysis may be performed to determine the first condition to apply based on which condition is likely to select the smallest set of records as the initial result data set (e.g., which condition has the highest degree of cardinality). In cases where the conditions include at least two conditions on hash keys of at least two different datasets, the hash keys may be employed to determine at least two sets of records by applying each condition on a hash key of a dataset. In such cases, the initial result data set may be generated as a union (e.g., a hash join) of the at least two sets of records from the at least two different datasets. After 906, or if it is determined at 904 that the conditions do not include condition(s) on hash key(s), the process may proceed to 908.

At 908, a condition is identified from among the remaining conditions included in the where clause of the statement. At 910, an inversion table is accessed that associates the data attribute included in the condition with the data attribute for the hash key of the dataset in the key-value store. At 912, the inversion table may be employed to determine one or more hash key value(s) that correspond to the data attribute included in the condition. Employment of the inversion tables in 910 and 912 may proceed as described above with reference to FIG. 8. In cases where an inversion table is not present that associates the data attribute included in the condition with the data attribute for the hash key, the process may access all records of the dataset of the key-value store and filter the records based on the condition to be applied, as described with reference to 814.

At 914, if the process is on a first iteration and no initial result data set was determined at 906, one or more records of the key-value store may be accessed based on applying the hash key value(s) determined at 912 and the record(s) may be incorporated into a working result data set. At 914, if the process is on a first iteration and an initial result data set was determined at 906, the hash key value(s) determined at 912 may be employed to determine record(s) of the initial result data set with the hash key value(s), and the record(s) may be saved in memory as the working result data set. At 914, if the process is on at least a second iteration, the hash key value(s) determined at 912 may be employed to determine record(s) of the current working result data set with the hash key value(s), and the record(s) may be saved in memory as the next iteration of the working result data set.

At 916, a determination is made whether there is at least one additional condition to analyze from the conditions included in the where clause of the statement. If so, the process may return to 908 and identify another condition to analyze. If not, the process may proceed to 918.

At 918, in cases where the statement is a select statement, one or more data attributes of the working result data set may be determined as the second result data set 130. For example, if the SQL statement is "select * from employees inner join departments d on e.department_ID=d.department_ID and first_name='Austin' and department_name='ENG'," then all the records of the working result data set may be returned as the second result data set 130. If the SQL statement specifies one or more columns, then the values of the corresponding data attribute(s) in the working result data set may be returned as the second result data set 130. At 918, in cases where the statement is other than a select statement (e.g., an update or delete statement), then the statement may be applied to the records of the work result data set.

Table 1 provides a non-limiting example of pseudo-code that may be employed in at least some implementations. In the pseudo-code of Table 1, the "statement" may be included in the first set of statements 108 to be translated, and the "results" may be included in the second result data set 130.

TABLE 1

```
generate_inital_result_set(tables, conditions)
    let tables = the set of all tables referred to by the statement
    let conditions = the set of all conditions from the where clauses in the
        statement
{
    let initial_table_results = a map whose keys are a table t from tables
        and whose values are a set of rows from t initialized to a sentinel
        value ALL_ROWS
    for each table t in tables {
        if conditions includes an equality condition on t where one side
            is a constant value cv and the other refers to the hash key of
            t {
            let t_entry = the entry from t with hash key cv
            if t_entry is not null {
                initial_table_results[t] = set(t_entry)
            } else {
                initial_table_results[t] = the empty set
            }
        }
    }
    return the cross product across all tables from initial_table_results
}
handle_condition(tables, conditions, results)
    let tables = the set of all tables referred to by the statement
    let conditions = the set of all conditions from the where and join
        clauses in the statement minus those handled by
        generate_initial_result_set
    let results = the output from generate_initial_result_set
{
    for each condition c in conditions {
        if c is an equality condition {
            if one side of c is a constant value cv and
                the other side ncv refers to a column in table t {
                if with an inversion table tinv exists for ncv {
                    let inv_results = the entries from tinv with hash key cv
                    results = hash_join(results, inv_results)
                } else {
                    results = filter(results, c)
                }
            } else {
                let lhs = the left side of c
                let rhs = the right side of c
                results = hash_join(results[lhs], results[rhs])
            }
        } else {
            results = filter(results, c)
        }
    }
    return results
}
filter(rows, condition) and hash_join(rows1, rows2) are filter and hash
join operations with the ability to expand ALL_ROWS sentinels into full
table queries.
```

Although the examples herein may describe particular types of statements (e.g., select, update, and delete statements), implementations are not limited to these examples. Implementations also support the translation of SQL insert statements. In such cases, the second set of statements 126 may be determined to add additional records into the specified dataset of the key-value store. Implementations also support the translation of hierarchical statements supported in Oracle™ SQL. Such statements may be translated into a series of statements in the second set of statements 126 that recursively select subsets of records to generate results similar to those of a hierarchical statement. Implementations also provide for the translation of SQL analytic functions such as count, max, min, sum, and avg.

Although the above examples describe intercepting and translating statements sent by executing application(s) 104, implementations are not so limited. Implementations may also be employed to translate data access statements present in source code of the application(s) 104, while the application(s) 104 are not executing. For example, implementations may be employed to refactor or otherwise modify source code of an application 104, to enable the application 104 to access a different type of data storage than the application 104 was originally designed to access. Implementations may also be employed to translate data access statements retrieved from logs of statements executed in a data storage device.

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art. It is intended that the present disclosure encompass such changes and modifications that fall within the scope of the appended claims.

What is claimed is:

1. A computer-implemented method, comprising:
intercepting a first set of statements sent by an executing application, the first set of statements configured to be executed on a relational data storage to generate a first result data set, the first set of statements described using first query language that is a version of Structured Query Language (SQL) supported by the relational data storage;
translating the first set of statements into a second set of statements described using a second query language that is different than the first query language;
executing the second set of statements on a non-relational data storage that supports the second query language;
receiving a second result data set from the non-relational data storage, the second result data set generated from the executing of the second set of statements on the non-relational data storage;
sending the second result data set to the executing application; and
after receiving the second result data set, determining whether the executing application exhibits one or more of a failure, an error, or an exception when the second set of statements are executed on the non-relational data storage.

2. The method of claim 1, wherein:
the non-relational data storage includes a key-value store; and
the determining is based on a comparison of the first result data set obtained from executing the first set of statements on the relational data storage and the second result data set obtained from the executing of the second set of statements on the non-relational data storage.

3. The method of claim 1, wherein:
the relational data storage stores a first set of data according to a relational data storage format; and
the non-relational data storage stores a second set of data according to a non-relational data storage format, the second set of data being substantially similar to at least a portion of the first set of data.

4. The method of claim 1, wherein the translating of the first set of statements into the second set of statements further comprises:
parsing the first set of statements to generate a parse tree for the first set of statements, the parsing based on a first grammar for the version of SQL supported by the relational data storage; and
traversing the parse tree to generate the second set of statements, including determining at least one statement in the second set of statements based on at least one subset of nodes of the parse tree.

5. A system, comprising:
at least one computing device configured to implement one or more services, wherein the one or more services are configured to:
intercept a first set of statements sent by an executing application, the first set of statements configured to be executed on a first data storage to generate a first result data set, the first set of statements described using a first query language supported by the first data storage;
translate the first set of statements into a second set of statements described using a second query language that is different than the first query language;
generate a second result data set from executing the second set of statements on a second data storage that supports the second query language;
send the second result data set to the executing application; and
determine whether the executing application exhibits one or more of a failure, an error, or an exception when the second set of statements are executed on the second data storage.

6. The system of claim 5, wherein:
the first data storage stores a first set of data according to a first data storage format;
the second data storage stores a second set of data according to a second data storage format that is different than the first data storage format, the second set of data being substantially similar to at least a portion of the first set of data; and
the first data storage and the second data storage support different transaction models.

7. The system of claim 5, wherein the first data storage and the second data storage include a relational data storage and a non-relational data storage.

8. The system of claim 5, wherein the translating of the first set of statements into the second set of statements further comprises:
parsing the first set of statements to generate a parse data structure for the first set of statements, the parsing based on a first grammar for the first query language; and
traversing the parse data structure to generate the second set of statements, including determining at least one statement in the second set of statements based at least partly on at least one subset of nodes of the parse data structure.

9. The system of claim 8, wherein the parse data structure is a parse tree.

10. The system of claim 8, wherein the determining of the at least one statement in the second set of statements is further based on at least one inversion table included in the second data storage.

11. The system of claim 5, wherein the one or more services are configured to:
determine whether the executing application exhibits one or more of a failure, an error, or an exception after receiving the second result data set.

12. The system of claim 5, wherein the one or more services are further configured to:
determine a first set of credentials enabling access to the first data storage;
determine a second set of credentials corresponding to the first set of credentials, the second set of credentials enabling access to the second data storage; and
employ the second set of credentials to execute the second set of statements on the second data storage.

13. The system of claim 5, wherein:
the first query language is a version of Structured Query Language (SQL) supported by the first data storage; and the first set of statements is configured to perform one or more of a select operation, an insert operation, an update operation, an inner join operation, a left outer join operation, a right outer join operation, a full outer join operation, a cross join operation, or a delete operation.

14. The system of claim 5, wherein:
the one or more services are further configured to:
execute the first set of statements on the first data storage to generate the first result data set; and
compare the first result data set to the second result data set.

15. One or more computer-readable media storing instructions which, when executed by at least one processor, instruct the at least one processor to perform actions comprising:
accessing a first set of statements sent by an application, the first set of statements configured to be executed on a first data storage to generate a first result data set the first set of statements described using a first query language supported by the first data storage;
translating the first set of statements into a second set of statements described using a second query language that is different than the first query language;
generating a second result data set from executing the second set of statements on a second data storage that supports the second query language;
sending the second result data set to the application; and
comparing the first result data set and the second result data set.

16. The one or more computer-readable media of claim 15, wherein:
the first data storage stores a first set of data according to a first data storage format; and
the second data storage stores a second set of data according to a second data storage format that is different than the first data storage format, the second set of data being substantially similar to at least a portion of the first set of data.

17. The one or more computer-readable media of claim 15, wherein the first data storage and the second data storage include a relational data storage and a non-relational data storage.

18. The one or more computer-readable media of claim 15, wherein
the first query language is a version of Structured Query Language (SQL) supported by the first data storage; and
the first set of statements is configured to perform one or more of a select operation, an insert operation, an update operation, an inner join operation, a left outer join operation, a right outer join operation, a full outer join operation, a cross join operation, or a delete operation.

19. The one or more computer-readable media of claim 15, the actions further comprising:
determining a first set of credentials enabling access to the first data storage;
determining a second set of credentials corresponding to the first set of credentials, the second set of credentials enabling access to the second data storage; and
employing the second set of credentials to execute the second set of statements on the second data storage.

20. The one or more computer-readable media of claim 15, wherein the translating of the first set of statements into the second set of statements further comprises:
parsing the first set of statements to generate a parse data structure for the first set of statements, the parsing based on a first grammar for the first query language; and
traversing the parse data structure to generate the second set of statements, including determining at least one statement in the second set of statements based at least partly on at least one subset of nodes of the parse data structure.

* * * * *

UNITED STATES PATENT AND TRADEMARK OFFICE
CERTIFICATE OF CORRECTION

PATENT NO.        : 9,535,948 B1                                    Page 1 of 1
APPLICATION NO.   : 14/107288
DATED             : January 3, 2017
INVENTOR(S)       : Cuthbert et al.

It is certified that error appears in the above-identified patent and that said Letters Patent is hereby corrected as shown below:

In the Claims

Column 21; Lines 19-20:
a first results data set the first set of … -- should read -- a first results data set, the first set of …

Signed and Sealed this
Twenty-eighth Day of March, 2017

Michelle K. Lee
*Director of the United States Patent and Trademark Office*